O. BILLINGS.
Hand-Seeder.
No. 54,999. Patented May 22, 1866.
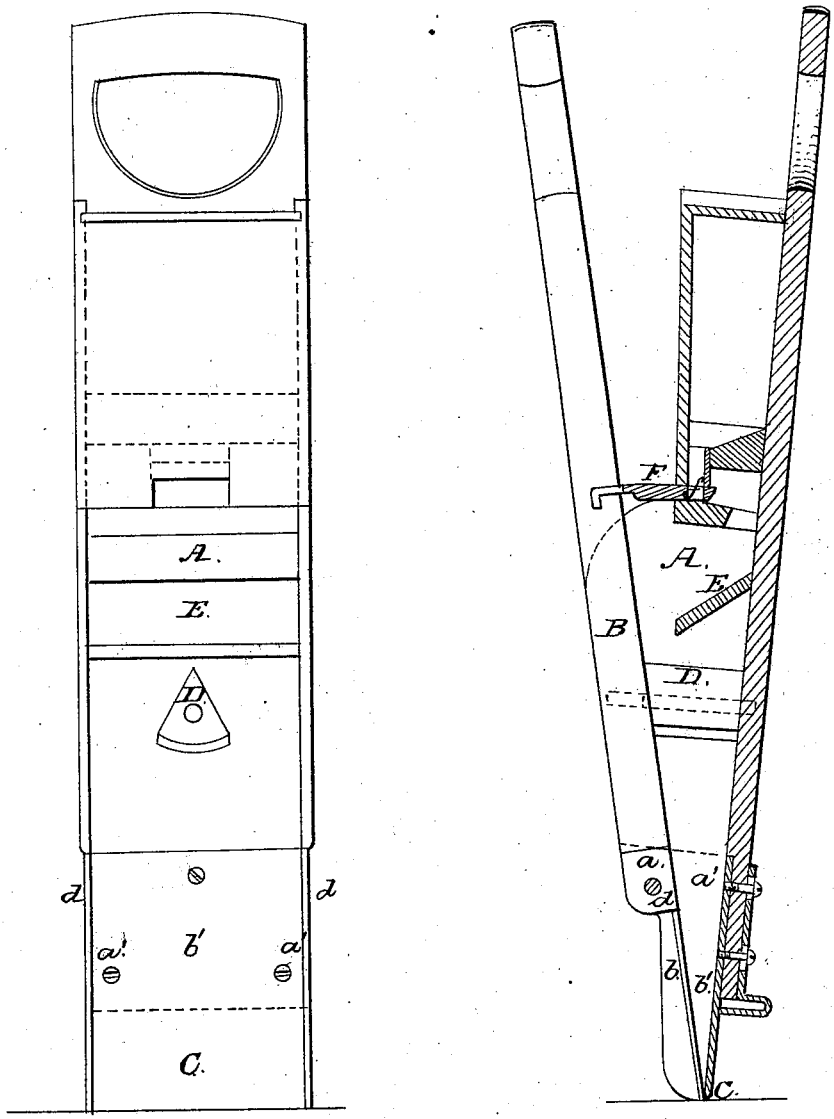
WITNESSES:
H. F. Willson
Charley Downing
INVENTOR:
Orson Billings

UNITED STATES PATENT OFFICE.

ORSON BILLINGS, OF LA GRANGE, ASSIGNOR TO HIMSELF, RUSSEL H. PENFIELD, AND HOMER PENFIELD, OF ELYRIA, OHIO.

IMPROVEMENT IN HAND CORN-PLANTERS.

Specification forming part of Letters Patent No. 54,999, dated May 22, 1866.

*To all whom it may concern:*

Be it known that I, ORSON BILLINGS, of La Grange, in the county of Lorain and State of Ohio, have invented certain new and useful Improvements in Hand Corn-Planters; and I do hereby declare that the following is a full, clear, and exact description thereof, reference being had to the accompanying drawings, and to the letters of reference marked thereon.

Figure 1 is a front elevation with the handle removed. Fig. 2 is a side elevation, showing the internal arrangement of the machine.

Like letters refer to like parts in the different figures.

The nature of my invention consists in the construction and operation of hand corn-planters.

The invention relates more particularly to the peculiar manner in which the seed is delivered into the inserters and thence into the soil, as will be fully described.

To enable others skilled in the art to make and use my invention, I will proceed to describe its construction and operation.

A represents the box of the machine, which is constructed in the form indicated in the drawings.

B represents the operating-handle, which is hinged to the box on a pivot, *a*, on which it operates.

C C are the inserters, which are constructed, in the form seen in the drawings, of sheet steel, having flanges *a* turned at right angles to plates *b b*, and are perforated at *a* for the purpose of admitting a pin, on which the handle operates.

D represents an elastic rubber spring, which is cut in the form seen at D, Fig. 1, having three acute angles, the upper angle being much more acute than the lower side angles. The under surface is curved, as seen in the drawings. This spring is perforated so as to admit a rod through it, on which it works. When this spring is placed in position and the handle is compressed the spring acts with great force. The angular form gives great support and durability, as it braces and counteracts any tendency to press over sidewise, and thus by continued pressure in getting out of shape and consequently ineffective.

E represents an inclined apron, which is secured inside of the box and projects forward just sufficiently to reach the inner side of the handle when said handle is pressed in.

F represents the seeding-slide, which is secured to the handle B and moves with said handle. When the handle is extended, as seen in the drawings, Fig. 2, the aperture *f*, which takes the seed, is filled and is ready for operation. The handle, when pressed in, carries with it the slide F, having aperture *f* charged with seed. When said handle is pressed entirely in the seed is discharged and falls directly onto the upper edge of inclined apron E and slides forward on the inclined plane of said apron to the front edge of the same. In thus sliding it becomes spread the whole width of the machine, and is retained in this position until the handle B is released, which springs off out of the way, and thus allows the seed to fall into the inserters, which are closed by the opening of the handle. In thus falling the kernels strike on the upper angle of the rubber spring, and are thereby separated and deflected to the sides of the inserters, and thereby the seed is effectually separated. This is a very important feature of this machine.

It will be observed that the angularly-shaped spring subserves two very important purposes—first, separating the seed; second, adding strength, durability, and elasticity to the spring.

What I claim as new, and desire to secure by Letters Patent, is—

1. The angularly-shaped rubber spring, having the two upper surfaces plain and the lower surface convex, and having the inner end cut at right angles to its axis and the outer end cut at such an angle that when adjusted and the handle of the machine is extended that it just corresponds to said angle, thus obtaining an equal pressure on all parts, as described and set forth.

2. Spring D, inclined apron E, and seeding-slide F, in combination with the inserters, for the purpose of delivering said seed to said inserters in a uniformly divided state, in the manner described and set forth.

ORSON BILLINGS. [L. S.]

In presence of—
 JOHN H. FAXON,
 H. F. WILLSON.